(12) United States Patent
Shmulyian et al.

(10) Patent No.: US 7,120,211 B2
(45) Date of Patent: Oct. 10, 2006

(54) ADAPTIVE RFI CANCELLER FOR DSL

(75) Inventors: Faina Shmulyian, Ramat Gan (IL);
Ehud Langberg, Wayside, NJ (US);
Patrick Duvaut, Eatontown, NJ (US)

(73) Assignee: Conexant, Inc., Red Bank, NJ (US)

( * ) Notice: Subject to any disclaimer, the term of this patent is extended or adjusted under 35 U.S.C. 154(b) by 752 days.

(21) Appl. No.: 10/393,345

(22) Filed: Mar. 21, 2003

(65) Prior Publication Data

US 2003/0223518 A1    Dec. 4, 2003

Related U.S. Application Data

(60) Provisional application No. 60/366,332, filed on Mar. 21, 2002.

(51) Int. Cl.
*H04L 1/00* (2006.01)

(52) U.S. Cl. ............... 375/346; 375/222; 375/285; 455/63; 455/296; 370/330; 370/344; 370/436; 370/478

(58) Field of Classification Search ........... 375/219, 375/222, 257, 285, 346; 455/50.1, 63, 67.3, 455/296; 370/252, 330, 343–345, 436, 442, 370/478
See application file for complete search history.

(56) References Cited

U.S. PATENT DOCUMENTS 5,625,651 A    4/1997    Cioffi (Continued)

FOREIGN PATENT DOCUMENTS

EP    1237339    9/2002

(Continued)

OTHER PUBLICATIONS

Ödling, Ola Börjesson, Thomas Magesacher, and Tomas Nordström, *An Approach to Analog Mitigation of RFI*, IEEE Journal on Selected Areas in Communications, vol. 20, No. 5, Jun. 2002, pp. 974-986.

(Continued)

*Primary Examiner*—Dac V. Ha
(74) *Attorney, Agent, or Firm*—Hunton & Williams LLP

(57) ABSTRACT

Disclosed herein are various mechanisms for the adaptive cancellation of radio frequency interference (RFI) in Discrete Multitone (DMT)-based signal transmissions systems. various mechanisms for the adaptive cancellation of radio frequency interference (RFI) in Discrete Multitone (DMT) modulated signal transmissions systems. In at least one embodiment of the present invention, RFI introduced by one or more RFI disturbers (e.g., ham radios) into a DMT modulated signal may be detected by calculating an RFI canceller coefficient for some or all of the DMT bins of the signal, where the RFI canceller coefficient represents the correlation between the noise at the corrupted bin and the reference RFI noise. The RFI canceller coefficients for the corrupted bins may be calculated using an LMS adaptation process. Those bins where the magnitude of the corresponding RFI canceller coefficient is greater than a certain threshold may be marked as corrupted by RFI. Further, one or more bins having RFI canceller coefficients with the largest magnitudes may be marked as reference disturber bins. The noise (e.g., error) present in the identified reference disturber bins may be determined using, for example, the slicer error. The RFI disturbance at some or all of the corrupted bins then may be estimated based at least in part on the error of the reference disturber bin proximal to the corrupted bin and the RFI canceller coefficient for the corrupted bin. The received signal then may be adjusted based on the RFI estimations for some or all of the corrupted bins to reduce or eliminate the RFI disturbance in the signal.

33 Claims, 5 Drawing Sheets

U.S. PATENT DOCUMENTS

| | | |
|---|---|---|
| 5,995,567 A | 11/1999 | Cioffi et al. |
| 6,014,412 A | 1/2000 | Wiese et al. |
| 6,047,022 A | 4/2000 | Reuven |
| 6,052,420 A | 4/2000 | Yeap et al. |
| 6,078,662 A | 6/2000 | Denedios |
| 6,285,718 B1 | 9/2001 | Reuven |
| 6,452,987 B1 | 9/2002 | Larsson et al. |
| 6,456,673 B1 * | 9/2002 | Wiese et al. ............... 375/346 |
| 6,470,059 B1 | 10/2002 | Starr |
| 6,683,913 B1 * | 1/2004 | Kantschuk ................ 375/258 |
| 2001/0026602 A1 | 10/2001 | Wiese et al. |

FOREIGN PATENT DOCUMENTS

| | | |
|---|---|---|
| EP | 1255359 | 11/2002 |
| WO | WO 9740609 | 10/1997 |
| WO | WO 9926365 | 5/1999 |
| WO | WO 0195580 | 12/2001 |

OTHER PUBLICATIONS

International Search Report for Application No. PCT/US03/08666, dated Sep. 7, 2003.

Brian Wiese, John Bingham, "Digital Radio Frequency Cancellation for DMT VDSL," TIE1.4, Dec. 1997.

Frank Sjoberg, Rickard Nillson, . . . , "Digital RFI Suppression in DMT-based VDSL Systems," Proceedings of International Conference on Telecommunications, Jun. 1998.

J. Cioffi, M. Mallory and J. Bingham, "Analog RF Cancellation with SDMT," TIE1.4, Apr. 1996.

Simon Haykin, "Adaptive Filter Theory," $2^{nd}$ Ed., Prentice Hall, 1991, pp. 299-333.

* cited by examiner

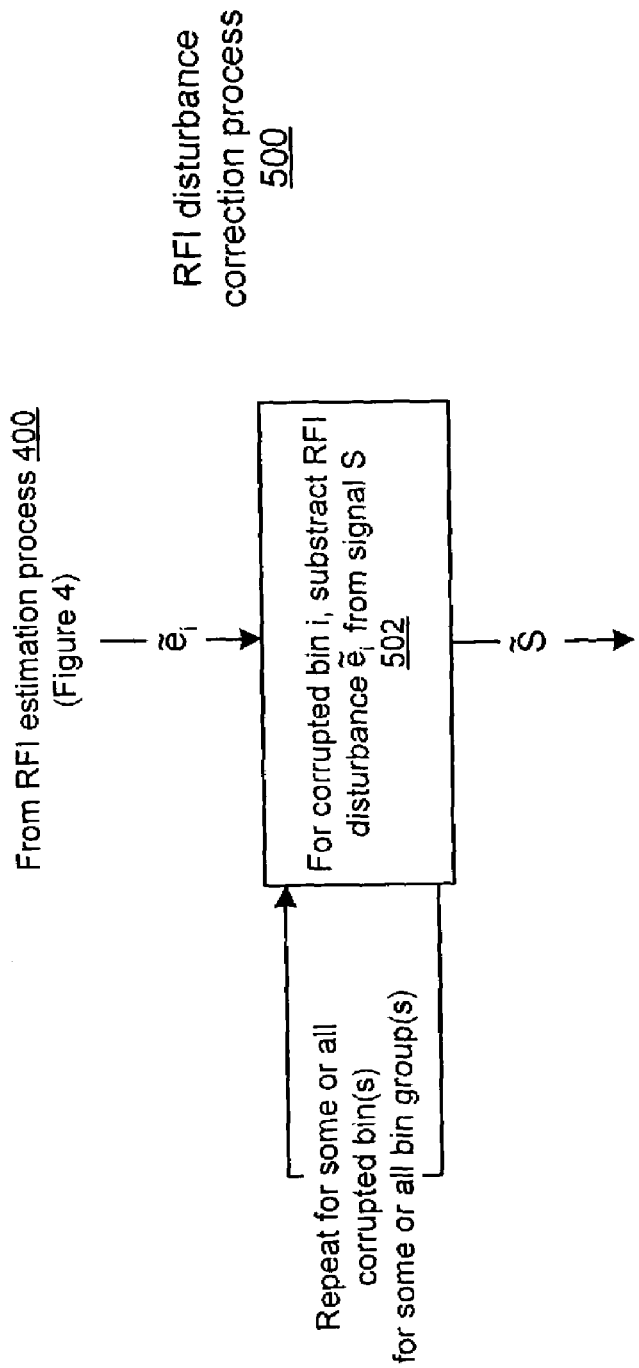

ADAPTIVE RFI CANCELLER FOR DSL

CROSS REFERENCE TO RELATED APPLICATIONS

Priority is claimed based on U.S. Provisional Application No. 60/366,332 entitled "Adaptive RFI Canceller for xDSL," filed Mar. 21, 2002, the entire disclosure of which is incorporated by reference herein.

FIELD OF THE INVENTION

The present invention relates generally to reducing radio frequency interference (RFI) in Discrete Multitone (DMT)-based communication systems and more particularly to reducing RFI in DMT-based digital subscriber line (DSL) systems using an estimate of RFI determined based at least in part on the slicer error of one or more reference bins and complex coefficient(s) determined using a least-mean-square (LMS)-based technique.

BACKGROUND OF THE INVENTION

Various techniques have been developed for the bi-directional transmission of data over twisted pair wire and similar physical medium. Two standards in particular, Asynchronous Digital Subscriber Line (ADSL) and Very High Digital Subscriber Line (VDSL), have demonstrated their beneficial use in such bi-directional transmission systems. ADSL is defined by American National Standard Institute (ANSI) T1.413 and International Telecommunication Union (ITU-T) G.992.1 (G.DMT) and VDSL is defined by ITU-T G.993.1 and ANSI T1.424. These two standards, as well as other similar standards, are commonly referred to collectively as "xDSL."

ADSL, VDSL and other similar DSL standards operate in a frequency range above the band reserved for plain old telephone system (POTS) transmission. For example, ADSL typically operates at frequencies between 25 kilohertz (kHz) and 1.1 megahertz (mHz). In transmitting data within the prescribed frequency band, these standards implement a Discrete Multitone (DMT) modulation mechanism that transmits data as a plurality of tones in a corresponding plurality of bins (also referred to as channels, sub-bands or carriers), each bin representing a certain portion of the prescribed frequency range. In ADSL, for example, 256 bins, each having a bandwidth of 4.3125 kHz, are used to transmit a 256-tone DMT symbol. The multitone symbol then is demodulated at the receiving end and converted back to digital data.

While providing for relatively high data transfer rates, the use of DMT over physical mediums such as twisted pair wire can be problematic in the presence of noise. Due to their relatively long length in typical xDSL applications (typically hundreds or thousands of meters), twisted pair wire loops may act as antennae by absorbing energy from radio transmissions. This undesirable absorbed radio energy commonly is referred to radio frequency interference (RFI). RFI is particularly problematic in ADSL and VDSL as a number of common radio transmitters, such as amplitude modulation (AM) radio transmitters and amateur radio transmitters (i.e., "ham" radios), operate at frequencies that fall within the frequency bands of ADSL and/or VDSL. Additionally, in DMT-based systems, such as ADSL and VDSL, RFI introduces noise into bins outside the RFI disturber's band due to sidelobe leakage.

Due to undesirable effects of RFI in xDSL systems, a number of techniques have been developed to minimize RFI and/or its effects. One common method is to utilize shielding around the twisted pair wire loop. While reducing RFI to some degree, shielding typically is costly and often does not attenuate RFI to a sufficient degree. In recognition of the shortcomings of using only shielding to eliminate RFI, digital signal processing-based processes have been developed to remove the effects of RFI at the receiver. The following references are representative of conventional digital signal processing-based processes: Brian Wise et al., "Digital Radio Frequency Cancellation for VDSL, T1E.4, December 1997 (commonly referred as the "Weise method"); Frank Sjoberg et al., "Digital RFI Suppression in DMT-based VDSL Systems," Proceedings of the International Conference on Telecommunications, June 1998 (commonly referred to as the "Sjoberg method"); and J. Cioffi et al., "Analog RF Cancellation with SDMT," T1E1.4, April 1996 (a modification to the Sjoberg method). Generally, these conventional processes are based on approximating the RFI and adjusting the received signal by the RFI approximation. An RFI estimation is made for every DMT symbol using measurements at a number of bins where the xDSL signal is not transmitted and this RFI estimation may then be used to adjust the corresponding DMT symbol. While the above-referenced methods may provide sufficient RFI reduction in certain instances, they have a number of limitations. For one, they are relatively complex computationally and therefore often require extensive storage and computational capacities. These conventional methods also often require more than one tone to approximate the RFI. Further, in instances where the RFI disturber has a bandwidth greater than the bandwidth of the DMT bin (e.g., a 6 kHz disturber bandwidth in an ADSL system using 4.3125 kHz DMT bins), the performance of these conventional methods may be severely limited.

Accordingly, an improved process for RFI reduction in DMT-based data transmission systems would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

In accordance with at least one embodiment of the present invention, a method for reducing radio frequency interference (RFI) in a discrete multitone (DMT) modulated signal is provided. The method comprises the steps of identifying one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin and selecting at least one reference bin from the one or more corrupted bins based at least in part on a comparison of the RFI canceller coefficient of the one or more corrupted bins. The method further comprises the step of estimating, for the at least one corrupted bin, an RFI disturbance at the corrupted bin based at least in part on the RFI canceller coefficient of the corrupted bin and a noise error of a reference bin proximate to the bin.

In accordance with another embodiment of the present invention, a system for reducing radio frequency interference (RFI) in a discrete multitone (DMT) modulated signal is provided. The system comprises an RFI detection module adapted to identify one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin and select at least one reference bin from the one or more corrupted bins based at least in part on a comparison of the RFI canceller coefficient of the one or more corrupted bins. The system further comprises an RFI estimation module being adapted to estimate, for the at least one corrupted bin, an RFI disturbance at the corrupted bin based at least in part on the RFI canceller coefficient of the corrupted bin and a noise error of a reference bin proximate to the bin.

In accordance with yet another embodiment of the present invention, a computer readable medium is provided. The computer readable medium comprises a set of executable instructions adapted to manipulate a processor to identify one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin, select at least one reference bin from the one or more corrupted bins based at least in part on a comparison of the RFI canceller coefficient of the one or more corrupted bins, and estimate, for the at least one corrupted bin, an RFI disturbance at the corrupted bin based at least in part on the RFI canceller coefficient of the corrupted bin and a noise error of a reference bin proximate to the bin.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIG. 5 is a flow diagram illustrating an exemplary RFI disturbance correction process in accordance with at least one embodiment of the present invention.

DETAILED DESCRIPTION OF THE INVENTION

The following description is intended to convey a thorough understanding of the present invention by providing a number of specific embodiments and details involving adaptive RFI reduction in xDSL and other DMT-based data transmission systems. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIGS. 1–5 illustrate various mechanisms for the adaptive cancellation of radio frequency interference (RFI) in Discrete Multitone (DMT) modulated signal transmissions systems. In at least one embodiment of the present invention, RFI introduced by one or more RFI disturbers (e.g., ham radios) into a DMT modulated signal may be detected by calculating an RFI canceller coefficient for some or all of the DMT bins of the signal, where the RFI canceller coefficient represents the correlation between the noise at the corrupted bin and the reference RFI noise. In at least one embodiment, the RFI canceller coefficients for the corrupted bins are calculated using an LMS adaptation process. Those bins where the magnitude of the corresponding RFI canceller coefficient is greater than a certain threshold may be marked as corrupted by RFI. Further, one or more bins having RFI canceller coefficients with the largest magnitudes may be marked as reference disturber bins. The noise (e.g., error) present in the identified reference disturber bins may be determined using, for example, the slicer error for the corresponding bin. The RFI disturbance at some or all of the corrupted bins then may be estimated based at least in part on the error of the reference disturber bin proximal to the corrupted bin and the RFI canceller coefficient for the corrupted bin. The received signal then may be adjusted based on the RFI estimations for some or all of the corrupted bins to reduce or eliminate the RFI disturbance in the signal. Although exemplary embodiments of the present invention are discussed below in the context of an xDSL system, the present invention may be beneficially utilized in other DMT-based systems without departing from the spirit or the scope of the present invention.

Figure 1:
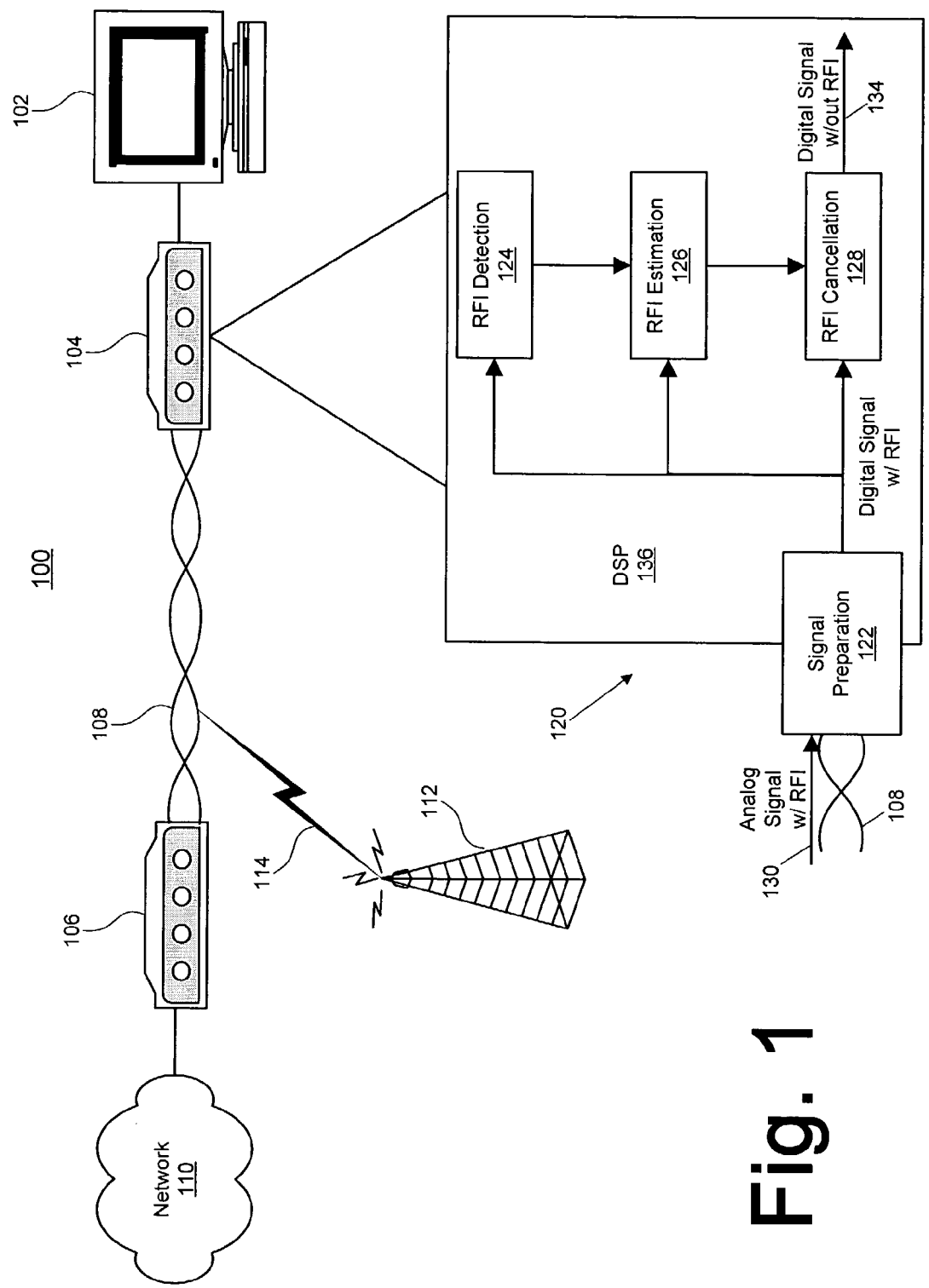
FIG. 1 is a schematic diagram illustrating an exemplary DSL system utilizing an adaptive RFI canceller in accordance with at least one embodiment of the present invention.

Referring now to FIG. 1, an exemplary xDSL system 100 implementing an adaptive RFI canceller is illustrated in accordance with at least one embodiment of the present invention. In the illustrated example, the xDSL system 100 includes one or more end user devices 102 (e.g., a workstation, personal computer or other networked device) operably connected to a DSL transceiver 104 and a DSL transceiver 106 operably connected to one or more networks 110, where the one or more networks 110 may include a local area network (LAN), wide area network (WAN), metropolitan area network (MAN), the Internet, etc., or a combination thereof. The DSL transceiver 104, due to its connection to the end user device 102 typically is referred to as an ADSL Termination Unit Remote (ATU-R) or a DSL modem. Due to its connection with one or more networks 110, the DSL transceiver 106 typically is referred to as an ADSL Termination Unit Central Office (ATU-C). The transceivers 104, 106 may be operably connected to one another over a physical medium, such as a twisted pair wire loop 108, typically of a length of hundreds or thousands of meters.

As will be appreciated by those skilled in the art, the length of the loop 108 often results in the loop 108 acting as an antenna for AM transmissions 114 from one or more AM transmitters (illustrated as RFI disturber 112) within transmission range of the loop 108. As noted above, the presence of AM transmissions within range of the loop 108 often introduces energy into the loop 108 in the form of RFI, resulting in narrow-band noise at the receiving end of the signal transmission. Accordingly, in at least one embodiment, the transceivers 104 and/or 106 may implement an adaptive RFI canceller 120 for reducing or eliminating the effects of the RFI.

As depicted in the illustrated embodiment, the adaptive RFI canceller 120 may include a signal preparation module 122, an RFI detection module 124, an RFI estimation module 126 and an RFI cancellation module 128. The modules 122–128 may be implemented as software, hardware, firmware, or a combination thereof. In at least one embodiment, at least part of the functionality of the modules 122–128 is implemented at least in part as one or more sets of executable instructions adapted to manipulate one or more digital signal processors (DSPs) 136 to perform the associated processes. For ease of illustration, the adaptive RFI canceller 120 is discussed herein in the context of its use by the xDSL transceiver 104 in reducing RFI in the downstream signal transmitted from the xDSL transceiver 106. Although there usually is no need to reduce RFI in the upstream signal, the adaptive RFI canceller 120 may be beneficially utilized in the xDSL transceiver 106 for reducing RFI in the upstream signal from the xDSL transceiver 104 as well, using the guidelines provided herein.

While receiving the DMT-modulated signal 130, the signal preparation module 122 may be adapted to prepare the signal 130 for RFI cancellation. Such preparations typically include signal processing and formatting techniques generally implemented in ADSL, VDSL or other DSL systems. Exemplary preparations performed by the signal preparation module 122 may include some or all of the following: analog-to-digital (ADC) conversion; parallel-to-serial (P/S) conversion; cyclic extension; transform by a Fast Fourier Transform (FFT); equalization by a frequency domain equalizer (FEQ) and/or a time domain equalizer (TEQ); symbol slicing by a slicer; and the like. The resulting output of the signal preparation module 122, i.e., the tones for each of the DMT bins, may be provided to the RFI detection module 124, the RFI estimation module 126 and/or the RFI cancellation module 128.

The RFI detection module 124 may be adapted to detect RFI introduced into the signal 130 by one or more RFI disturbers 112. As discussed in detail below with reference to RFI detection process 300 (FIG. 3), in one embodiment, the RFI detection module 124 may detect RFI disturbances in the signal by calculating RFI canceller coefficients for some or all of the DMT bins of the signal. Those DMT bins whose RFI canceller coefficient has a magnitude greater than a predefined threshold may be marked as "corrupted" bins and one or more of the "corrupted" bins having RFI canceller coefficients with the largest magnitude may be selected as reference disturber bins used for removing RFI interference from the remaining corrupted bins. Further, the RFI detection module 124 may be adapted to determine the error present in the selected reference disturber bins using, for example, the slicer error for the corresponding bin.

The RFI estimation module 126 may be adapted to estimate the RFI disturbance for some or all bins identified as corrupted bins. As discussed in detail below with reference to the RFI estimation process 400 (FIG. 4), in one embodiment, the RFI estimation module 126 may estimate the RFI disturbance for a corrupted bin based at least in part on the noise error for the reference disturber bin proximate to the corrupted bin and in part on the RFI complex coefficient calculated for the corrupted bin.

The RFI cancellation module 128, in at least one embodiment, is adapted to modify the received signal to reduce or eliminate the RFI based at least in part on the RFI disturbance estimation generated by the RFI estimation module 126. As discussed in detail below with reference to the RFI cancellation process 500 (FIG. 5), in one embodiment, the RFI cancellation module 128 may modify the received signal to remove the estimated RFI by subtracting the estimated RFI disturbance (or some variation of the estimated RFI) from the received signal at the corresponding corrupted bin.

As a result of the processes performed by the RFI detection module 124, RFI estimation module 126 and the RFI cancellation module 128, an output signal 134 having considerably reduced or eliminated RFI disturbance may be provided to the remainder of the xDSL transceiver 104 for additional processing, if necessary. As will be appreciated by those skilled in the art, the exemplary technique described above may require relatively little memory and computational complexity, as it utilizes, in one embodiment, an LMS adaptation process to determine the RFI canceller coefficient for only those DMT bins deemed to be corrupted by RFI due to their relatively high amount of RFI disturbance. It also may be appreciated that the above-described technique has a desirable convergence rate and may reduce the RFI at the corrupted bins to the general noise level. Further, the exemplary technique typically does not negatively affect the xDSL transceiver performance in the event that the RFI disturber was erroneously evaluated.

Figure 2:
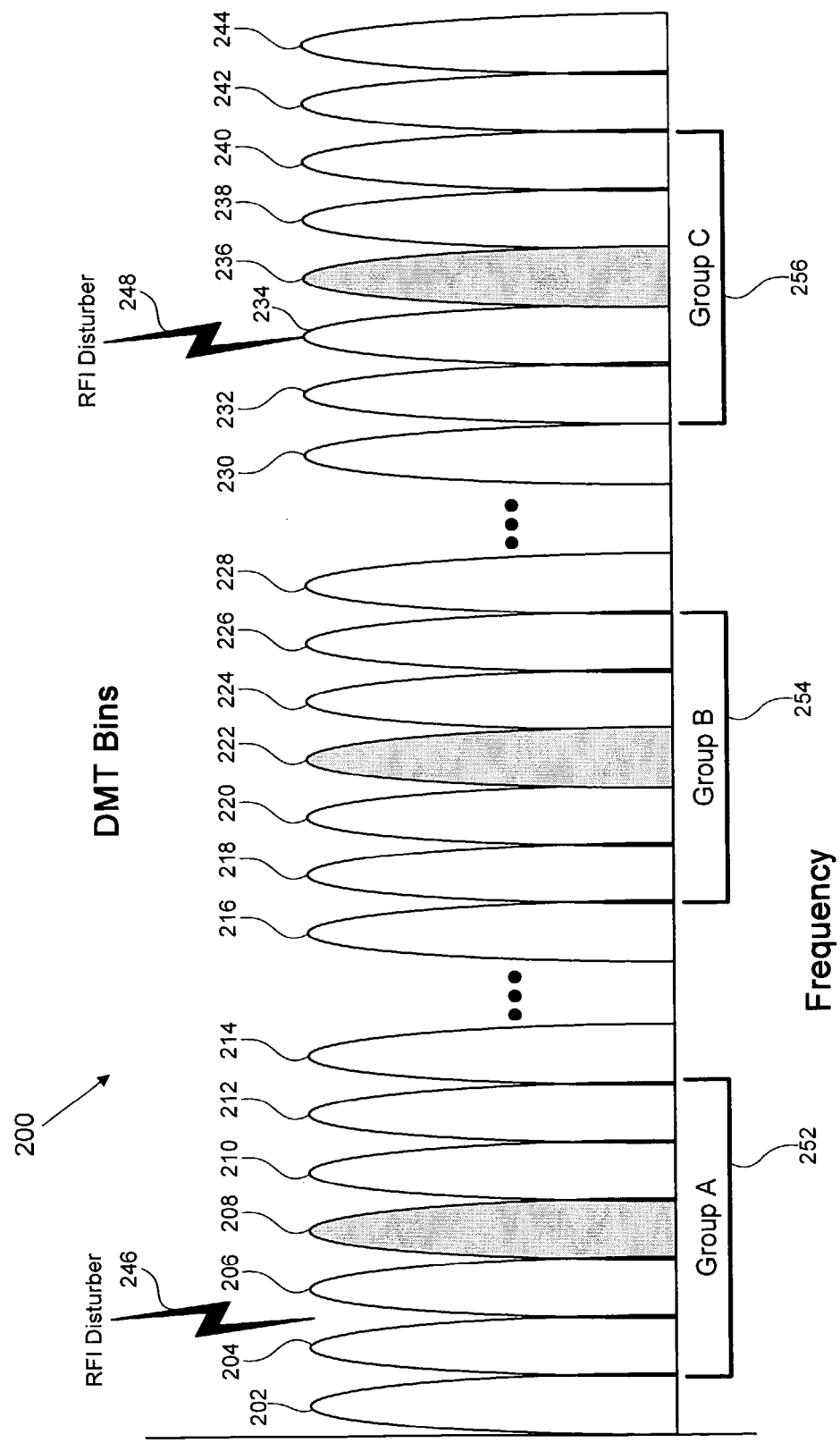
FIG. 2 is a graph diagram illustrating an exemplary DMT scheme in accordance with at least one embodiment of the present invention.
Figure 3:
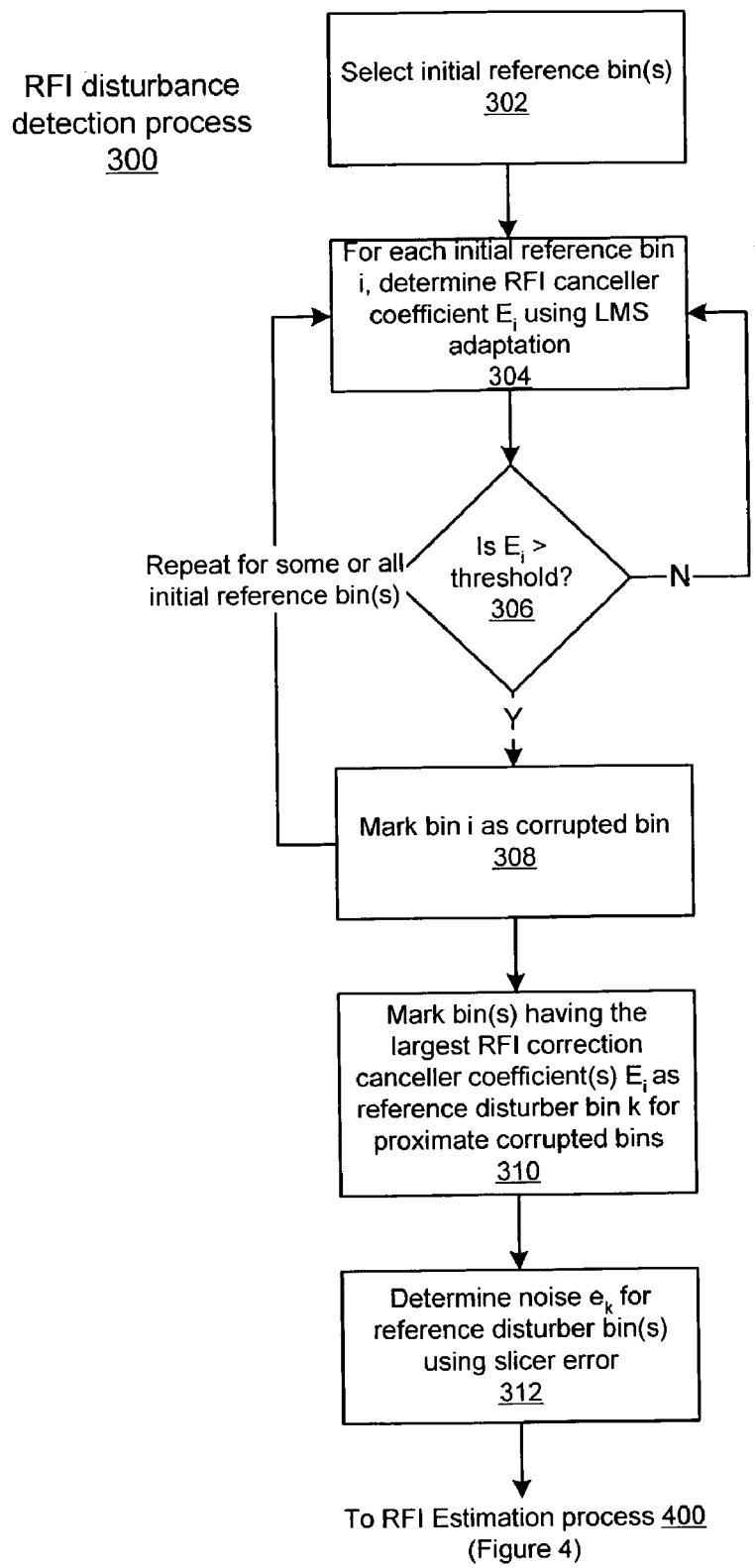
FIG. 3 is a flow diagram illustrating an exemplary RFI disturbance detection process in accordance with at least one embodiment of the present invention.

Referring now to FIGS. 2 and 3, an exemplary implementation of an RFI disturbance detection process 300 using a DMT configuration 200 is illustrated in accordance with at least one embodiment of the present invention. As noted above, xDSL transmissions may be modulated into a number of DMT frequency bins. In ADSL, the frequency range of 25 kHz to 1.1 MHz typically is divided into 256 DMT bins, each having a frequency "width" of 4.3125 kHz. For ease of illustration, the exemplary DMT configuration 200 includes only 22 of the ADSL bins (DMT bins 202–244). Further, in the illustrated example, it is assumed that two RFI disturbers, RFI disturbers 246, 248, may be present, with RFI disturber 248 introducing RFI at a frequency centered within DMT bin 234 and RFI disturber 246 introducing RFI having a bandwidth wider than a single DMT bin bandwidth and therefore introducing RFI into both DMT bin 204 and DMT bin 206. It is further assumed that the RFI disturbers 246, 248 also may affect one or more proximate DMT bins due to sidelobe leakage. In the following discussion, three variations may be considered: the presence of only RFI disturber 246; the presence of only RFI disturber 248; and the presence of both RFI disturbers 246, 248.

In at least one embodiment, the following process 300 of FIG. 3 is based at least in part on the observation that error for each corrupted bin (e.g., the slicer error output) includes both RFI noise that correlates with the RFI disturber(s) and an uncorrelated noise component. It may be further observed that the contribution to the error due to RFI is greatest at the bin located closest to the actual frequency or frequencies of the RFI disturber(s), where the contribution to the error by RFI may be represented by the magnitude of a RFI canceller coefficient calculated for the bin. The RFI canceller coefficient at this bin therefore may be used as a reference signal to reduce or cancel RFI at other corrupted bins, as described below.

The RFI disturbance detection process 300 may initiate at step 302 wherein one or more DMT bins may be selected as initial reference bins for identifying the frequency location(s) of the RFI disturber(s). The number and position of the initial reference bins may be selected in any of a variety of manners. It may be desirable to select the desired number of initial reference bins so that they are distributed equally across the entire frequency band used by the xDSL system. Alternatively, the initial reference bins may be selected from portions of the frequency spectrum where RFI disturber(s) are known to or are expected to interfere. To illustrate, the following frequency ranges typically are assigned for AM radio and/or amateur radio use in North America (ranges 2–4), Europe, Asia and Africa: (1) 140–285 kHz; (2) 535–1705 kHz; (3) 1800–2000 kHz; and (4) 3500–4000 kHz. It will be appreciated that many of these ranges fall within the frequency band of ADSL and VDSL. Accordingly, since RFI disturbers may be expected in one or more of these frequency ranges, it may be appropriate to select initial reference bins that reside within the applicable frequency range. It will be appreciated that while a larger number of bins may result in an increased likelihood of accurately detecting the frequency location of an RFI disturber, the greater number of selected initial reference bins typically increases the computational effort in performing the adaptive RFI cancellation process. For the purposes of explanation, it is assumed that bins 208, 222, and 236 are selected as initial reference bins.

At step 304, an RFI canceller coefficient $E_i$ may be determined for some or all of the DMT bins. As noted above, in at least one embodiment, the RFI canceller coefficient $E_i$ represents a correlation between the noise at the bin i and the RFI at a proximate initial reference bin. The RFI canceller coefficient may be determined based at least in part on one or more iterations of an LMS adaptation technique. The benefits of using LMS, or a variant thereof, in determining the RFI canceller coefficient include: LMS adaptation is robust to RFI changes; LMS adaptation typically does not corrupt the signal (the convergence is fast); and LMS adaptation requires relatively limited computational complexity and storage capacity. To determine the RFI canceller coefficient $E_i$ representing this correlation, the following LMS adaptation process may be implemented.

The LMS adaptation process may be formalized as a mean squared error (MSE) problem. Accordingly, the RFI canceller coefficient $E_i$ for a selected bin i preferably should minimize the following equation:

$$J = E[e_i - E_i \cdot e_k]^2 \rightarrow \min \qquad \text{EQ. 1}$$

where $e_i$ represents the slicer error (i.e., noise error) of the selected bin i, $e_k$ represents the slicer error of the initial reference bin k proximate to the selected bin i, $E_i$ represents the RFI canceller coefficient determined for bin i, $E[\ ]$ represents the expected value of $e_i - E_i^* e_k$ and J represents the resulting mean-squared value. In at least one embodiment, the initial reference bin most proximate to the selected bin is utilized in EQ. 1 as the resulting RFI canceller coefficient $E_i$ is more likely influenced by RFI disturbers in adjacent bins than those at frequencies further away from the selected bin. Accordingly, if bins 208, 222, and 236 are selected initial reference bins, it may be appropriate to use bin 208 as a proximate initial reference bin when calculating the RFI canceller coefficient $E_i$ for some or all of bins 202–206 and bins 210–214. Likewise, bins 216–220 and 224–228 may use bin 222 as a proximate initial reference bin and bins 230–234 and bins 238–244 may use bin 236 as a proximate initial reference bin.

To find the optimal RFI canceller coefficients for the criterion of EQ. 1, a Stochastic Gradient Descent technique may be used. For an overview of the Stochastic Gradient Descent method, see, e.g., Simon Haykin, "Adaptive Filter Theory," $2^{nd}$ Ed., Prentice Hall, 1991, pp. 299–333. For each iteration n, the next approximation (n+1) of the RFI canceller coefficient may be obtained as follows:

$$E_i(n+1) = E_i(n) - \Delta G(n) \qquad \text{EQ. 2}$$

$$G = \frac{dJ}{2dE_i} = -E[|e_i - E_i \cdot e_k| \cdot e_k^*] \qquad \text{EQ. 3}$$

$$E_i(n+1) = E_i(n) + \frac{2^{-\mu}}{|e_k(n)^2|} \left[ (e_i(n) - E_i(n) \cdot e_k(n)) \cdot e_k^*(n) \right] \qquad \text{EQ. 4}$$

where μ represents the adaptation shift and $e_k^*$ represents the error at the reference bin k complex conjugate. Accordingly, EQs. 2–4 may be repeated for a number of iterations until a sufficiently optimal RFI canceller coefficient has been determined. Three to ten iterations generally are sufficient.

In certain instances, multiple RFI disturbers may be contributing RFI noise to a particular bin. Accordingly, in at least one embodiment, a RFI canceller coefficient may be determined for each RFI disturber using the following model modified from the above equations:

$$E_{i,p}(n+1) = E_{i,p}(n) + \frac{2^{-\mu}}{|e_p(n)^2|} \left[ (e_i(n) - E_{i,p}(n) \cdot e_p(n)) \cdot e_p^*(n) \right] \quad \text{EQ. 5}$$

where p represents the $p^{th}$ RFI disturber, $E_{i,p}$ represents the RFI canceller coefficient at the corrupted bin i for the $p^{th}$ RFI disturber, $e_p$ represents the slicer output at the $p^{th}$ reference bin, and $e_p^*$ represents the error at the $p^{th}$ reference bin complex conjugate.

Although one implementation of the present invention whereby the RFI canceller coefficient for a corrupted bin is calculated using a Stochastic Gradient Descent technique is described herein, other LMS adaptation techniques may be utilized without departing from the spirit or the scope of the present invention.

At step 306, the magnitude of the RFI canceller coefficient $E_i$ may be compared to a threshold T to ensure that insignificant RFI does not unnecessarily trigger an RFI cancellation effort. In the event that the RFI canceller coefficient $E_i$ exceeds the threshold T (i.e., $|E_i|>T$), the bin i may be marked as a "corrupt" bin at step 308, where the term "corrupt" indicates that the bin has been at least somewhat significantly effected by introduced RFI. Otherwise, if the magnitude of the RFI canceller coefficient $E_i$ does not exceed the threshold (i.e., $|E_i|<=T$), the process 300 may return to step 304 to evaluate the next bin. Likewise, after marking a corrupted bin as such, the process 300 may return to step 304 for the next bin.

In the event that at least one bin of the subset of bins being evaluated is deemed to be corrupted by RFI, the one or more corrupted bins of the group may be compared at step 310 to determine those corrupted bin(s) with the RFI canceller coefficients having the largest magnitude. As noted above, it may be observed that the bin having the RFI canceller coefficient with the largest magnitude likely is the bin having most or all of the energy from a RFI disturber. Accordingly, one or more of these corrupted bins may be designated as the reference disturber bins, denoted as reference disturber bins k. The number of corrupted bins having the greatest magnitude RFI canceller coefficient selected as reference disturber bins may be based on any number of factors. For example, the number of corrupted bins selected as reference disturber bins may be based on, for example, the magnitude of the RFI canceller coefficients of the selected corrupted bins relative to other RFI canceller coefficients of proximate corrupted bins.

Figure 4:
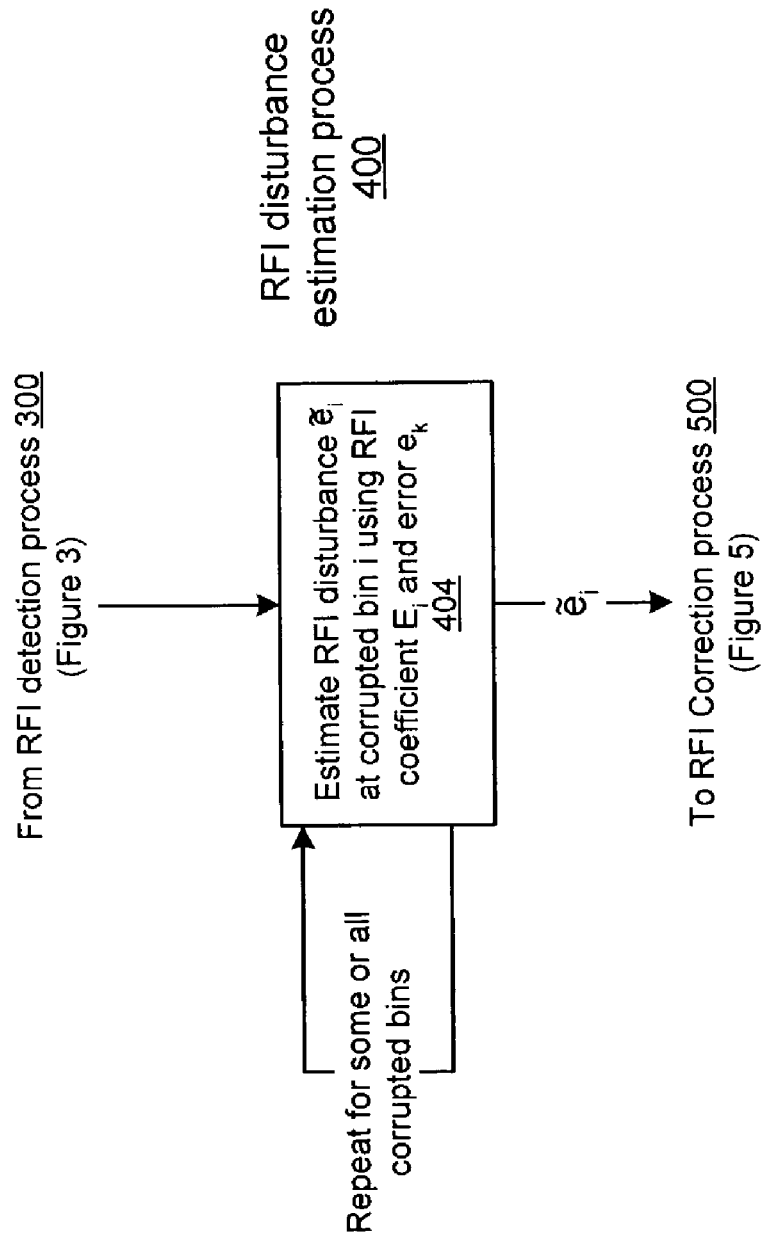
FIG. 4 is a flow diagram illustrating an exemplary RFI disturbance estimation process in accordance with at least one embodiment of the present invention.

At step 312, the noise error $e_k$ of the one or more RFI disturber bins k may be determined and then provided to the RFI estimation module 126 (FIG. 1) for use in RFI estimation during the RFI estimation process 400 (FIG. 4). It will be appreciated that the slicer error represents the difference between the actual signal value and the correct signal value and, therefore, typically represents the total noise introduced into a bin. Accordingly, the noise error $e_k$ preferably is determined as the slicer output for the bin.

Referring now to FIG. 4, an exemplary implementation of the RFI estimation process 400 is illustrated in accordance with at least one embodiment of the present invention. As noted above, in at least one embodiment, the RFI for each bin of a group may be estimated based at least in part on the error $e_k$ of the reference bin k for the group and in part on a RFI canceller coefficient determined based at least in part on one or more iterations of an LMS adaptation technique.

The process 400 initiates at step 402, wherein an estimation of the RFI disturbance (denoted $\tilde{e}_i$) for some or all corrupted bins may be determined. In at least one embodiment, the RFI disturber estimation $\tilde{e}_i$ for corrupted bin i of a particular bin group may be determined as a product of the RFI canceller coefficient $E_i$ for the corrupted bin and the slicer error $e_k$ of the reference disturber bin proximate to the corrupted bin, or:

$$\tilde{e}_i = E_i \cdot e_k \quad \text{EQ. 6}$$

In the event that multiple RFI canceller coefficients are determined for the corrupted bin due to the presence of multiple RFI disturbers or an RFI disturber having a bandwidth that spans multiple bins, the RFI disturber estimation $\tilde{e}_i$ for corrupted bin i may be determined as:

$$\tilde{e}_i = \sum_{1}^{p} E_{i,p} \cdot e_k \quad \text{EQ. 7}$$

where p represents the number of RFI canceller coefficients associated with the corrupted bin i.

Alternatively, other techniques to estimate the RFI disturbance at a corrupted bin using the estimated RFI canceller coefficient(s) and the reference error may be utilized without departing from the spirit or the scope of the present invention. To illustrate, the product of the error $e_k$ and the RFI canceller coefficient $E_i$ may be adjusted by a constant factor or by a variable factor whose value may be based on, for example, one or more of the frequency, the number of corrupt DMT bins, the frequency "distance" between the corrupted bin and the proximate reference disturber bin, and the like.

Referring now to FIG. 5, an exemplary implementation of the RFI cancellation process 500 is illustrated in accordance with at least one embodiment of the present invention. As noted above, the signal may be adjusted by the estimated RFI disturbances $\tilde{e}_i$ calculated for some or all corrupted bins, thereby resulting in an output signal (denoted as $\tilde{S}$) substantially similar to the desired output signal unaffected by RFI. RFI cancellation preferably is not performed on the reference bins of each bin group having corrupted bin because these reference bins serve to provide the estimation of the error caused by the RFI disturber.

As illustrated in FIG. 5, the signal preferably may be adjusted at step 502 to cancel RFI by subtracting the estimated RFI disturbance $\tilde{e}_i$ from the received signal S. In other words:

$$\tilde{S} = S - \Sigma \tilde{e}_i \quad \text{EQ.8}$$

Alternatively, other techniques to adjust the signal S using the estimated RFI disturbance $\tilde{e}_i$ may be utilized without departing from the spirit or the scope of the present invention. To illustrate, the RFI disturbance $\tilde{e}_i$ may be adjusted by a constant factor or by a variable factor whose value may be based on, for example, one or more of the frequency, the number of corrupted DMT bins, the distance between the corrupted bin and the group reference bin, and the like.

In at least one embodiment of the present invention, the adaptive RFI canceller described above may be beneficially utilized in an xDSL transceiver in conjunction with one or more FEQs, whereby the output signal of the one or more FEQs is processed to reduce or eliminate RFI disturbance as described above. Accordingly, the RFI disturbance detection process and RFI estimation training may be performed in the training mode of the xDSL transceiver after the FEQ training mode. The RFI canceller coefficients and reference disturber bin errors determined during training mode may be utilized for RFI cancellation during the data mode. Due to the possibility that the RFI disturbers may shift frequency, the RFI canceller may be retrained periodically during the data mode. To illustrate, an FDP symbol may be transmitted periodically (e.g., every 69 symbols) for training purposes. Because this FDP symbol has a known value, any RFI disturbance may be measured in the received signal and the RFI canceller may be adjusted as using the guidelines above.

In the event that FEQ and adaptive RFI cancellation are used in concert, certain considerations may be appropriate. One such consideration is that the Tone Ordering Table may require altering if RFI cancellation is used. In this case, it may prove beneficial that the reference tones be processed first by the FEQ and the demapper and then all other tones may be processed. Another consideration is that it may be advantageous to always transmit the signal at each bin, even at bins with zero bit-loading, to ensure that FEQ adaptation and tone recovery after bit-swap are possible.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for reducing radio frequency interference (RFI) in a discrete multitone (DMT) modulated signal, the method comprising the steps of:
   identifying one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin;
   selecting at least one reference bin from the one or more corrupted bins based at least in part on a comparison of the RFI canceller coefficient of the one or more corrupted bins; and
   estimating, for the at least one corrupted bin, an RFI disturbance at the corrupted bin based at least in part on the RFI canceller coefficient of the corrupted bin and a noise error of a reference bin proximate to the bin.

2. The method as in claim 1, further comprising the step of adjusting the signal based at least in part on the estimated RFI disturbance.

3. The method as in claim 2, wherein the step of adjusting the signal includes subtracting, for one or more corrupted bins, the estimated RFI disturbance of the corrupted bin from the signal.

4. The method as in claim 1, wherein a bin is identified as a corrupted bin when a magnitude of the RFI canceller coefficient of the bin is greater than the predetermined threshold.

5. The method as in claim 1, further comprising the step of determining, for each of the plurality of bins, the RFI canceller coefficient for the bin.

6. The method as in claim 5, wherein the RFI canceller coefficient is determined based at least in part on a least-mean-squared (LMS) adaptation.

7. The method as in claim 6, wherein the RFI canceller coefficient is determined using the equation:

$$E_i(n+1) = E_i(n) + \frac{2^{-\mu}}{|e_k(n)^2|}\left[(e_i(n) - E_i(n) \cdot e_k(n)) \cdot e_k^*(n)\right]$$

where n represents a previous iteration of the LMS adaptation, n+1 represents a current iteration, $E_i$ represents the RFI corrector coefficient of a bin i, $e_i$ represents a noise error of the bin i, $e_k$ represents a noise error of an initial reference bin of the signal, $e_k^*$ represents a complex conjugate of $e_k$, and $\mu$ represents an adaptation shift.

8. The method as in claim 7, wherein the initial reference bin is selected based on an expected frequency of one or more RFI disturbers.

9. The method as in claim 8, wherein the RFI disturbance for a corrupted bin is estimated based at least in part on a product of the RFI canceller coefficient of the corrupted bin and the noise error of the reference bin.

10. The method as in claim 9, wherein the noise error of the reference bin includes a slicer error for the reference bin.

11. A system for reducing radio frequency interference (RFI) in a discrete multitone (DMT) modulated signal, the system comprising:
    an RFI detection module adapted to:
       identify one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin; and
       select at least one reference bin from the one or more corrupted bins based at least in part on a comparison of the RFI canceller coefficient of the one or more corrupted bins; and
    an RFI estimation module being adapted to estimate, for the at least one corrupted bin, an RFI disturbance at the corrupted bin based at least in part on the RFI canceller coefficient of the corrupted bin and a noise error of a reference bin proximate to the bin.

12. The system as in claim 11, further comprising an RFI cancellation module adapted to adjusting the signal based at least in part on the estimated RFI disturbance.

13. The system as in claim 12, wherein RFI cancellation module is adapted to adjust the signal by subtracting, for one or more corrupted bins, the estimated RFI disturbance of the corrupted bin from the signal.

14. The system as in claim 11, wherein the RFI detection module is adatped to identify a bin as corrupted when a magnitude of the RFI canceller coefficient of the bin is greater than the predetermined threshold.

15. The system as in claim 11, wherein the RFI detection module is further adapted to determine the RFI canceller coefficient for each of the plurality of bins.

16. The system as in claim 15, wherein the RFI detection module is further adapted to determine the RFI canceller coefficient based at least in part on a least-mean-squared (LMS) adaptation.

17. The system as in claim 16, wherein the RFI detection module is adapted to determine the RFI canceller coefficient using the equation:

$$E_i(n+1) = E_i(n) + \frac{2^{-\mu}}{|e_k(n)^2|}\left[(e_i(n) - E_i(n) \cdot e_k(n)) \cdot e_k^*(n)\right]$$

where n represents a previous iteration of the LMS adaptation, n+1 represents a current iteration, $E_i$ represents the RFI corrector coefficient of a bin i, $e_i$ represents a noise error of the bin i, $e_k$ represents a noise error of an initial reference bin of the signal, $e_k^*$ represents a complex conjugate of $e_k$, and $\mu$ represents an adaptation shift.

18. The system as in claim 17, wherein the initial reference bin is selected based on an expected frequency of one or more RFI disturbers.

19. The system as in claim 11, wherein the RFI estimation module is adapted to estimate the RFI disturbance for a corrupted bin based at least in part on a product of the RFI canceller coefficient of the corrupted bin and the noise error of the reference bin.

20. The system as in claim 11, wherein the noise error of the reference bin includes a slicer error for the reference bin.

21. The system as in claim 11, wherein the system is part of a digital subscriber line (xDSL) transceiver.

22. A computer readable medium comprising a set of executable instructions adapted to manipulate a processor to:
identify one or more bins of a plurality of DMT bins of the signal as corrupted by RFI based at least in part on a comparison of a RFI canceller coefficient associated with each bin and a predetermined threshold, the RFI canceller coefficient being representative of a correlation between noise at the bin and RFI at a reference bin;
select at least one reference bin from the one or more corrupted bins based at least in part on a comparison of the RFI canceller coefficient of the one or more corrupted bins; and
estimate, for the at least one corrupted bin, an RFI disturbance at the corrupted bin based at least in part on the RFI canceller coefficient of the corrupted bin and a noise error of a reference bin proximate to the bin.

23. The computer readable medium as in claim 22, wherein the set of executable instructions is further adapted to manipulate the processor to adjust the signal based at least in part on the estimated RFI disturbance.

24. The computer readable medium as in claim 23, wherein the set of executable instructions is further adapted to manipulate the processor to subtract, for one or more corrupted bins, the estimated RFI disturbance of the corrupted bin from the signal.

25. The computer readable medium as in claim 22, wherein a bin is identified as a corrupted bin when a magnitude of the RFI canceller coefficient of the bin is greater than the predetermined threshold.

26. The computer readable medium as in claim 22, wherein the set of executable instructions is further adapted to manipulate the processor to determine, for each of the plurality of bins, the RFI canceller coefficient for the bin.

27. The computer readable medium as in claim 26, wherein the RFI canceller coefficient is determined based at least in part on a least-mean-squared (LMS) adaptation.

28. The computer readable medium as in claim 27, wherein the set of executable instructions is further adapted to manipulate the processor to determine the RFI canceller coefficient using the equation:

$$E_i(n+1) = E_i(n) + \frac{2^{-\mu}}{|e_k(n)^2|}\left[(e_i(n) - E_i(n) \cdot e_k(n)) \cdot e_k^*(n)\right]$$

where n represents a previous iteration of the LMS adaptation, n+1 represents a current iteration, $E_i$ represents the RFI corrector coefficient of a bin i, $e_i$ represents a noise error of the bin i, $e_k$ represents a noise error of an initial reference bin of the signal, $e_k^*$ represents a complex conjugate of $e_k$, and $\mu$ represents an adaptation shift.

29. The computer readable medium as in claim 28, wherein the initial reference bin is selected based on an expected frequency of one or more RFI disturbers.

30. The computer readable medium as in claim 22, wherein the set of executable instructions is further adapted to manipulate the processor to estimate the RFI disturbance for a corrupted bin based at least in part on a product of the RFI canceller coefficient of the corrupted bin and the noise error of the reference bin.

31. The computer readable medium as in claim 22, wherein the noise error of the reference bin includes a slicer error for the reference bin.

32. The computer readable medium as in claim 22, wherein the processor includes a digital signal processor (DSP).

33. The computer readable medium as in claim 32, wherein the DSP is implemented as part of a digital subscriber line (xDSL) transceiver.

* * * * *